Figure 1:
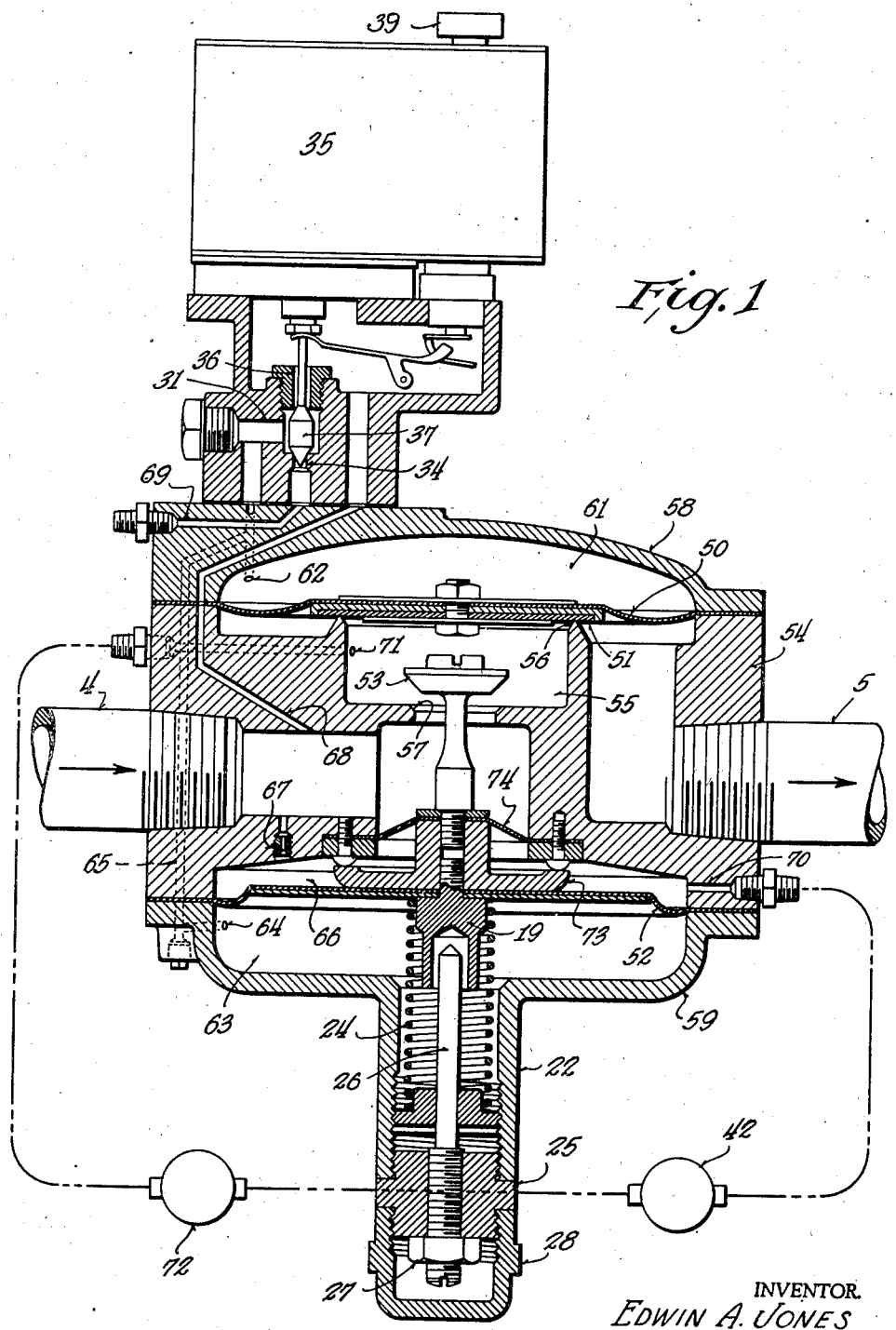

Patented Oct. 31, 1944

2,361,632

UNITED STATES PATENT OFFICE 2,361,632

AUTOMATIC CONTROL MEANS

Edwin A. Jones, Webster Groves, Mo.

Original application May 25, 1940, Serial No. 337,134. Divided and this application May 19, 1943, Serial No. 487,589

12 Claims. (Cl. 236—80)

This invention relates to automatic control means.

This invention is designed to provide a system and automatic modulating control means which are so arranged that automatic control of a gas burner or other heating means for a furnace, boiler, or industrial heating equipment is provided; and which is so constructed that modulation of the fuel flow or of one ingredient of the combustible mixture is automatically obtained and a final cut-off is provided, the relation of the modulating valve and on and off valve being such that a full or adequate fuel flow is always initially obtained to preclude flashback during ignition, the modulating control aways bringing the fuel flow to the selected condition for which the device is set or to an artifical condition produced by condition responsive means.

More specifically objects of this invention are to provide a main on and off valve and a modulating valve which are automatically related and which, in the preferred forms, provide for a full opening of the modulating valve upon closure of the main on and off valve and which provide for the supplying of fuel at a pressure which does not exceed a predetermined maximum regulated pressure when the main valve is open and which also provide a modulating control which controls the fuel flow in accordance with the demands of the system.

Further objects are to provide a unitary structure in which both the main on and off valve and the modulating valve are provided, in which this single unitary structure may be handled, installed, or adjusted as a unitary device, which is compact, which is simple to manufacture, and which has a very small number of parts.

Further objects are to provide a construction which has all of the features hereinabove enumerated and which in addition automatically completely cuts off when the pressure in the supply mains falls below a predetermined value.

Further objects are to provide a combined modulating regulator and cut-off device in which the device may be manually adjusted to provide any desired minimum flow and any desired regulated pressure at which an ingredient of a combustible mixture is supplied the burner, so that the device automatically maintains the selected pressure when full flow is called for and never modulates below the selected minimum flow but instead provides complete cut off when less than the minimum flow is required.

Further objects are to provide a construction having a main on and off valve and a modulating valve which will not operate erratically even if too large a burner is employed or if too small a main supply pipe or other insufficient supply obtains, but which is so constructed that the modulating regulator automatically adjusts itself to its proper position even though either or both of these exaggerated and undesirable installation conditions may obtain.

In greater detail, objects of this invention are to provide a modulating regulator which has an on and off valve and a modulating valve so related that the modulating valve is on the high pressure side of the line ahead of the on and off valve, and the on and off valve is on the low pressure side of the line behind the modulating valve in reference to the direction of fluid flow, the modulating valve always moving against the fluid pressure as it approaches its seat, and to provide a fluid pressure motive means for the valves which has a bleed leading to a point between the two valves so that this discharge is automatically changed over from the high side of the line to the low side of the line when the on and off valve opens and is automatically changed back to the high side of the line when the on and off valve closes, without the use of any auxiliary apparatus.

Further objects are to provide a system of control for a heating device in which condition responsive means are provided for controlling the main on and off valve and in which condition responsive means are provided for controlling the modulating valve, the motion of the modulating valve towards restricted position being under the control of one or more condition responsive means one of which may be arranged to adjust the modulating valve in a gradual manner in accordance with a condition in one part of the system, and the other of which may cause the modulating regulator to move towards minimum flow position at repeated intervals in accordance with the needs of the heated medium at another part of the system.

An embodiment of the invention is shown in the accompanying drawing, in which:

The figure is a sectional view through one form of modulating regulator and a portion of an electric control valve.

This application is a division of application Serial No. 337,134, filed May 25, 1940, now Patent No. 2,328,279 dated Aug. 31, 1943, by the same inventor for Automatic control means for a heating device.

In the drawing, a valve body is shown as having an inlet 4 thereto, connecting the valve with a source of a fluid fuel ingredient under pressure, as gas. An outlet 5 leads from the valve body to a burner, as appears in the parent application.

The valve mechanism is under overall control of a space thermostat (not shown) which controls a pilot valve 35. Construction and connection of these parts are also shown in the parent case.

In the valve body, a diaphragm 50 controls an on and off valve 51, and a diaphragm 52 controls a modulating valve 53. These diaphragms are located on opposite sides of the body portions 54 of the modulating regulator, and a space of opening 55 is provided between the valve seat 56 of the on and off valve and the valve seat 57 of the modulating valve.

The upper diaphragm is held clamped in place by means of the upper casing 58 and the lower diaphragm is clamped in place by means of the lower casing 59. This lower casing is provided with the extended neck portion 22 which carries an adjustable nut against which a compression spring 24 acts to urge the diaphragm 52 upward with a force determined by the setting of the nut. A nut 25 closes the end of the neck 22 and adjustably supports a pin 26 that limits downward movement of the diaphragm 52 and the valve 53, by engagement thereon of a cap member forming, with a plate 73, a clamp secured to the diaphragm, and a support for the valve. The pin 26 is adjustable in the nut 25 and may be secured in adjusted position by a lock nut 27. The position of the pin determines the minimum opening of the valve 53.

The upper casing 58 carries an electric valve 35 which has been described in the copending application. This electric valve is one which shifts a valve member 35 from a valve port 34 to a valve port 36 upon energizing of a control circuit. The control circuit is normally closed by operation of a space thermostat to heat-demanding position. It may be equipped with a manually adjustable means 39 in the conventional manner for controlling the valve member 37 in the event that the electric current fails and it is desired to operate the electric valve manually.

The upper chamber 61 above the upper diaphragm 50 communicates with the port 31 of the electric valve by means of a passageway or port 62. The lower chamber 63 below the lower diaphragm communicates with the passageway 62 by means of ports or passageways 64 and 65. The upper chamber 66 above the lower diaphragm 52 communicates with the high pressure side of the line by means of a restricted supply bleed 67 which consists of a removable apertured plug so that for different conditions plugs with different size apertures may be employed to secure an adjustment of the rate of flow of pressure fluid into the chamber 66. Also it is preferable to make the passageway 64 smaller than the passageway 62 for a reason hereinafter to appear. It is to be borne in mind also that if desired, these passageways 64 and 62 may be made of the same size and an adjusting needle valve may be interposed in the passageway 65 to provide the relative difference in area.

The port 36 of the electric valve communicates at all times with the high pressure side of the line by means of the port or passageway 68. The port 34 of the electric valve communicates with the vent or exhaust port or passageway 69. The chamber 66 above the lower diaphragm is provided with a port or passageway 70 which is connected through condition responsive means with a port or passageway 71 leading to the space 55 between the on and off valve and the modulating valve.

As described in greater detail in the copending application, one or more condition responsive means may be employed. Two have been shown in the figure, namely, the condition responsive means 42 and an additional condition responsive means 72. These condition responsive means are throttling valves automatically operated to throttle the line upon existence of predetermined conditions. For example, one may be a thermostatically operated valve subjected to furnace temperature. The other may be a heat relay type of throttling valve subjected to space temperature. Details are given in the parent application, but as details are not here claimed, it is thought unnecessary to do more than state that they may be types of valves familiar in the art. It is to be distinctly understood that it is intended that either one, two or more condition responsive means could be employed, two having been shown in the figure hereof.

When the electric valve 35 is deenergized, its valve member 37 is in its lowermost position as shown. Under these conditions, pressure from the high side of the line is supplied through the port 36 of the electric valve to the chamber 61 above the upper diaphragm and to the chamber 63 below the lower diaphragm. Pressure also is supplied to the chamber 66 above the lower diaphragm 52 by the supply bleed 67 and inasmuch as the pressures on both sides of the lower diaphragm 52 are equal, the spring 24 will move the modulating valve to its uppermost position.

In the specific form chosen for illustration, the member 73 located on the upper side of the lower diaphragm 52 constitutes a limit member and engages a stationary portion of the valve body. A suitable small sealing diaphragm 74 is provided to separate the chamber 66 on the upper side of the lower diaphragm 52 from the high pressure side of the line. The on and off valve 51 is in closed position and the modulating valve 53 is in fully open position under the conditions outlined hereinabove.

*Operation*

Ordinarily, when the system is about to call for heat, the condition responsive means 42 and 72 would be open and the electric valve would have its member 37 in the lowermost position. Under these conditions, an additional means of supplying pressure fluid to the upper chamber 66 above the lower diaphragm 52 would be provided from the port 71 to the port 70.

If the temperature in the room or other point of control drops below a predetermined value, the electric valve is energized, thus raising its valve member 37 and closing its upper port 36 and opening its lower port 34. Under these conditions, the pressure in the upper chamber 61 is relieved through the vent 69 and the on and off valve rises. The pressure from the chamber 63 below the lower diaphragm 52 is also vented through the passageways 64 and 65, but inasmuch as the port or passageway 64 is smaller than the port or passageway 62, the modulating valve will move towards regulated position more slowly and therefore an adequate supply of fuel is supplied the burner during ignition, irrespective of the position of the condition responsive means 42 and 72. This result also obtains from making the area of the valve seat 56 greater than that of the seat 57, as shown in the drawing. The result is that a small displacement of the valves, such as occurs when the ports are first exhausted, obtains a large flow through the valve seat 56, whereas the corresponding displacement of the valve 53 toward closed position has substantially no effect. Normally however, these condition responsive means are in open position under the conditions hereinabove outlined and are, therefore, open.

As soon as the on and off valve opens, the port 71 is automatically transferred from connection with the high side of the line to connection with the low side of the line and consequently the pressure in the chamber 66 is that of the low side of the line as the relative area of the supply bleed leak 67 and the port 71 is such that there is substantially no effect produced under these conditions by the high pressure supply bleed leak 67. Therefore, the modulating regulator will adjust the pressure of the fuel supplied initially during ignition to a pressure not exceeding that of the selected regulated pressure. If either or both of the condition responsive means 42 and 72 is partially closed, an artificial pressure is built up in the chamber 66 so that the modulating valve 53 will move nearer its seat and consequently will modulate the fuel flow still more in accordance with the demands of the system.

Any number of condition responsive means could be employed, two having been shown. Assume for simplicity of illustration that the condition responsive means 42 now responds to an increase in temperature and throttles. The modulating valve 53 will move still closer to its seat and this will continue as the temperature rises until the modulating valve 53 arrives at minimum flow position where further motion is arrested as previously described. Under these conditions minimum flow persists.

If the minimum flow is sufficient to just maintain the temperature at the desired point, nothing further happens, but if the temperature rises above the desired point, for intsance in the room, the room thermostat will open the circuit of the electric valve 35 and the valve member 37 thereof will descend and will place high pressure fluid in the chamber 61, causing the on and off valve 51 to close. This on and off valve, therefore, cuts off all flow of fuel to the burner. Additional high pressure fluid is supplied to the lower chamber 63 below the lower diaphragm 52 and high pressure fluid is also supplied through the high pressure bleed 67 to the upper chamber 66 above the lower diaphragm 52. Inasmuch as the pressures on opposite sides of the diaphragm are equal, the spring 24 will move the modulating valve 53 to its uppermost position as shown in the figure.

If the ports 70 and 71 were directly connected and the condition responsive means omitted, the device would operate as a combined on and off valve and pressure regulator, for it is obvious that when the on and off valve 51 opens, the port 71 is automatically transferred from the high pressure side of the line to the low pressure side of the line and consequently the modulating valve 53 would operate as a pressure regulator.

If the device were used as a straight pressure regulator, the high pressure supply bleed 67 could be omitted and a solid plug substituted if desired, though this would not be necessary.

If it is desired, the port 65 could be omitted and the port 64 could communicate directly with the outside air. This arrangement would not be as advantageous as the one shown and described, for under these conditions when the main on and off valve closed, pressure fluid would build up in the chamber 66 above the lower diaphragm and the modulating valve 53 would close. Therefore, whenever the on and off valve opened, the modulating valve would start from closed position and not from open position as previously described.

The condition responsive means 42 or 72 could take any desired form. One form has been suggested for the condition responsive means 42 and this condition responsive means could be placed wherever desired as previously described. The other condition responsive means 72 could be similar to the condition responsive means 42 and could be placed at a different location if desired.

The function of the means 42 and 72 is to effect modulation of the valve 53 in response to conditions at some predetermined point or points. If one is located in a furnace bonnet, it will throttle the line as the temperature of the furnace goes up. As a result, the low side pressure in chamber 66 will be trapped, and will be increased by the high pressure from port 67, so that the diaphragm will be forced down, lowering the valve 53 toward closed position. The valve 53 will thus modulate flow of fuel to the burner in accordance with the temperature at the member 42. In analogous manner, other valves such as valve 72, may be employed to modulate according to additional conditions, such as room temperature within a range slightly below the actual cut-off temperature at which valve 37 is operated.

The foregoing shows that this mechanism provides a combined cut-off and pressure regulator, and a modulator, and particularly one in which the regulating or modulating valve is open at the time the main cut-off valve opens.

What is claimed is:

1. In a mechanism of the kind described, valve means comprising a first valve and a second valve arranged in series in a line, a valve seat for each valve, an inlet leading to the first valve seat to introduce fluid at high pressure thereto, a confined space between and connecting the valve seats adapted to have low pressure relative to the first valve, an outlet leading from the second valve seat and adapted to be connected to a burner or the like, a first diaphragm connected to the first vavle, a second diaphragm connected to the second valve, a first pressure chamber open to one side of the first diaphragm and a second pressure chamber open to one side of the second diaphragm, a third diaphragm chamber on the side of the first diaphragm opposite the first diaphragm chamber, first port means connecting into the first diaphragm chamber, second port means connecting into the second diaphragm chamber, means selectively to connect said two port means to receive line pressure or to exhaust, third port means connecting the third diaphragm chamber with the space between the valve seats whereby pressure may build up in the third diaphragm chamber against that in the first, means to operate the selector means to connect the first and second port means to exhaust to cause the second valve to open and to enable the first valve to move toward closed position under pressure in the third chamber, and means to cause the second valve to open before the first valve can close when the selector means connects its ports aforesaid to exhaust.

2. In a mechanism of the kind described, valve means comprising a first valve and a second valve arranged in series in a line, a valve seat for each valve, an inlet leading to the first valve seat to introduce fluid at high pressure thereto, a confined space between and connecting the valve seats adapted to have low pressure relative to the first valve, an outlet leading from the second valve seat and adapted to be connected to a burner or the like, a first diaphragm connected to the first valve, a second diaphragm connected to the second valve, a first pressure chamber open to one side of the first diaphragm and a second pressure chamber open to one side of the second diaphragm, a third diaphragm chamber on the side of the first diaphragm opposite the first diaphragm chamber, first relatively restricted port means connecting into the first diaphragm chamber, second relatively free port means connecting into the second diaphragm chamber, means selectively to connect said two port means to receive line pressure or to exhaust third port means connecting the third diaphragm chamber with the space between the valve seats whereby pressure may build up in the third diaphragm chamber against that in the first, means to operate the selector means to connect the first and second port means to exhaust to cause the second valve to open and to enable the first valve to move toward closed position under pressure in the third chamber, the restriction of the first port means eeffcting a time-delay in said movement of the first valve.

3. In a mechanism of the kind described, valve means comprising a first valve and a second valve arranged in series in a line, a valve seat for each valve, an inlet leading to the first valve seat to introduce fluid at high pressure thereto, a confined space between and connecting the valve seats adapted to have low pressure relative to the first valve, an outlet leading from the second valve seat and adapted to be connected to a burner or the like, a first diaphragm connected to the first valve, a second diaphragm connected to the second valve, a first pressure chamber open to one side of the first diaphragm and a second pressure chamber open to one side of the second diaphragm, a third diaphragm chamber on the side of the first diaphragm opposite the first diaphragm chamber, first port means connecting into the first diaphragm chamber, second port means connecting into the second diaphragm chamber, means selectively to connect said two port means to receive line pressure or to exhaust, third port means connecting the third diaphragm chamber with the space between the valve seats whereby pressure may build up in the third diaphragm chamber against that in the first, means to operate the selector means to connect the first and second port means to exhaust to cause the second valve to open and to enable the first valve to move toward closed position under pressure in the third chamber, means to cause the second valve to open before the first valve can close when the selector means connects its ports aforesaid to exhaust, fourth port means to introduce inlet pressure into the third chamber, and means to regulate the size of the third port means relative to that of the fourth port means to modulate the pressure in the third chamber, and the first valve.

4. In a mechanism of the kind described, valve means comprising a first valve and a second valve arranged in series in a line, a valve seat for each valve, an inlet leading to the first valve seat to introduce fluid at high pressure thereto, a confined space between and connecting the valve seats adapted to have low pressure relative to the first valve, an outlet leading from the second valve seat and adapted to be connected to a burner or the like, a first diaphragm connected to the first valve, a second diaphragm connected to the second valve, a first pressure chamber open to one side of the first diaphragm and a second pressure chamber open to one side of the second diaphragm, a third diaphragm chamber on the side of the first diaphragm opposite the first diaphragm chamber, first relatively restricted port means connecting into the first diaphragm chamber, second relatively free port means connecting into the second diaphragm chamber, means selectively to connect said two port means to receive line pressure or to exhaust third port means connecting the third diaphragm chamber with the space between the valve seats whereby pressure may build up in the third diaphragm chamber against that in the first, means to operate the selector means to connect the first and second port means to exhaust to cause the second valve to open and to enable the first valve to move toward closed position under pressure in the third chamber, the restriction of the first port means effecting a time-delay in said movement of the first valve, fourth port means to introduce inlet pressure into the third chamber, and means to regulate the size of the third port means relative to that of the fourth port means to modulate the pressure in the third chamber, and the first valve.

5. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm secured to said pressure regulating valve, a second pressure chamber having said second diaphragm as a movable wall thereof, means for varying the pressure within said first pressure chamber to cause said shut-off valve member to move between open and closed positions, and a fluid connection between said second chamber and that portion of the valve housing between said pressure regulating and shut-off valves.

6. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member concentrically therewith, a first pressure chamber having said first diaphragm as a movable wall thereof, a second diaphragm concentrically disposed with respect to said first diaphragm and secured to said pressure regulating valve, a second pressure chamber having said second diaphragm as a movable wall thereof, means for varying the pressure within said first pressure chamber to cause said shut-off valve member to move between open and closed positions, and a fluid connection between said second chamber and that portion of the valve housing between said pressure regulating and shut-off valves.

7. A combination pressure regulator and shut-off valve assembly comprising a valve housing having an inlet and an outlet, a pressure regulating valve disposed in said valve housing, a shut-off valve disposed in said housing on the outlet side of said pressure regulating valve and comprising a shut-off valve member, a first diaphragm secured to said shut-off valve member, a first pressure chamber having said first diaphragm as a movable wall thereof, a second diaphragm secured to said pressure regulating valve, a second pressure chamber having said second diaphragm as a movable wall thereof, means including a three-way pilot valve operative in one position to admit inlet pressure to said first pressure chamber to cause said shut-off valve member to move to closed position and in another position to permit the fluid within said first pressure chamber to escape to cause said shut-off valve to move to open position, and a fluid connection between said second chamber and that portion of the valve housing between said pressure regulating and shut-off valves.

8. A combination pressure regulator and shut-off valve assembly comprising a valve housing having an inlet and an outlet, and a flow conducting passage therebetween, a pressure regulating valve disposed in said passage in said valve housing, a shut-off valve disposed in said passage in said housing on the outlet side of said pressure regulating valve and comprising a shut-off valve member, a first diaphragm connected with said shut-off valve member, a first pressure chamber having said first diaphragm as a movable wall thereof, a second diaphragm connected with said pressure regulating valve, a second pressure chamber separated from the flow conducting passage, the second chamber having said second diaphragm as a movable wall thereof, means for varying the pressure within said first pressure chamber to cause said shut-off valve member to move between open and closed positions, and a fluid connection between said second chamber and that portion of the valve housing between said pressure regulating and shut-off valves.

9. A combination pressure regulator and shut-off valve assembly comprising a valve housing having an inlet and an outlet, and a flow conducting passage therebetween, a pressure regulating valve disposed in said passage in said valve housing, a shut-off valve disposed in said passage in said housing on the outlet side of said pressure regulating valve and comprising a shut-off valve member, a first diaphragm connected with said shut-off valve member, a first pressure chamber having said first diaphragm as a movable wall thereof, a second diaphragm connected with said pressure regulating valve, a second pressure chamber separated from the flow conducting passage, the second chamber having said second diaphragm as a movable wall thereof, means for varying the pressure within said first pressure chamber to cause said shut-off valve member to move between open and closed positions, a fluid connection between said second chamber and that portion of the valve housing between said pressure regulating and shut-off valves, and means to regulate the flow of fluid through said fluid connection.

10. A combination pressure regulator and shut-off valve assembly comprising a valve housing having an inlet and an outlet, and a flow conducting passage therebetween, a pressure regulating valve disposed in said passage in said valve housing, a shut-off valve disposed in said passage in said housing on the outlet side of said pressure regulating valve and comprising a shut-off valve member, a first diaphragm connected with said shut-off valve member, a first pressure chamber having said first diaphragm as a movable wall thereof, a second diaphragm connected with said pressure regulating valve, a second pressure chamber separated from the flow conducting passages, the second chamber having said second diaphragm as a movable wall thereof, means for varying the pressure within said first pressure chamber to cause said shut-off valve member to move between open and closed positions, a fluid connection between said second chamber and that portion of the valve housing between said pressure regulating and shut-off valves, means to regulate the flow of fluid through said fluid connection, and a restricted fluid connection between the inlet and the second chamber.

11. A combination pressure regulator and shut-off valve assembly comprising a valve housing having an inlet and an outlet, and a flow conducting passage therebetween, a pressure regulating valve disposed in said passage in said valve housing, a shut-off valve disposed in said passage in said housing on the outlet side of said pressure regulating valve and comprising a shut-off valve member, a first diaphragm connected with said shut-off valve member, a first pressure chamber having said first diaphragm as a movable wall thereof, a second diaphragm connected with said pressure regulating valve, a second pressure chamber separated from the flow conducting passage, the second chamber having said second diaphragm as a movable wall thereof, means for varying the pressure within said first pressure chamber to cause said shut-off valve member to move between open and closed positions, a fluid connection between said second chamber and that portion of the valve housing between said pressure regulating and shut-off valves, and means producing a force on the second diaphragm, opposing the pressure in the second chamber, which force increases with displacement of the second diaphragm.

12. In a mechanism of the kind described, a valve housing having an inlet and an outlet, a chamber between the inlet and the outlet, a cut-off opening between the chamber and the outlet, a throttling opening between the chamber and the inlet, a cut-off valve for controlling the cut-off opening, a throttling valve to control the throttling opening, automatic means to operate the cut-off valve between cut-off and open positions, means additional to said automatic means, for operating the throttling valve, including a diaphragm connected with the throttling valve, said diaphragm being attached to the housing, means providing a diaphragm chamber on one side of the diaphragm, said diaphragm chamber being separated from the chamber between the inlet and outlet, port means connecting the diaphragm chamber with the chamber between the inlet and outlet, automatic means to regulate the size of said port means, and pressure means acting upon the additional means oppositely to the pressure in the diaphragm chamber, said pressure means applying a force to operate the valve that varies with the movement of the diaphragm.

EDWIN A. JONES.